United States Patent [19]

Mitter et al.

[11] Patent Number: 4,950,325
[45] Date of Patent: Aug. 21, 1990

[54] PROCESS FOR HEATING STEEL MELTS AND AN APPARATUS FOR CARRYING OUT THE PROCESS

[75] Inventors: Gerhard Mitter, Traun; Luzian Pochmarski; Otto Köller, both of Leoben, all of Austria

[73] Assignee: Voest-Alpine Stahl Donawitz Gesellschaft m.b.H., Leobin-Donawitz, Austria

[21] Appl. No.: 390,243

[22] Filed: Aug. 7, 1989

[30] Foreign Application Priority Data

Aug. 8, 1988 [AT] Austria .................... 1996/88

[51] Int. Cl.$^5$ .............................................. C21C 7/02
[52] U.S. Cl. .................................... 75/537; 266/225
[58] Field of Search .................................... 75/53, 58

[56] References Cited

U.S. PATENT DOCUMENTS 3,980,469 9/1976 Forster ................................. 75/53

Primary Examiner—Peter D. Rosenberg
Attorney, Agent, or Firm—Cushman, Darby & Cushman

[57] ABSTRACT

An apparatus for heating steel melts covered with a slag rich in iron oxide, and employed in particular for continuous steel making processes such as the KVA process, incorporates a height-adjustable injection lance for supplying metals which react exothermally with the melt and with the oxygen in the slag. The nozzle of the injection lance is adjustably arranged above the contents of the ladle so that it can be maintained in the zone of the melt/slag phase boundary.

7 Claims, 1 Drawing Sheet

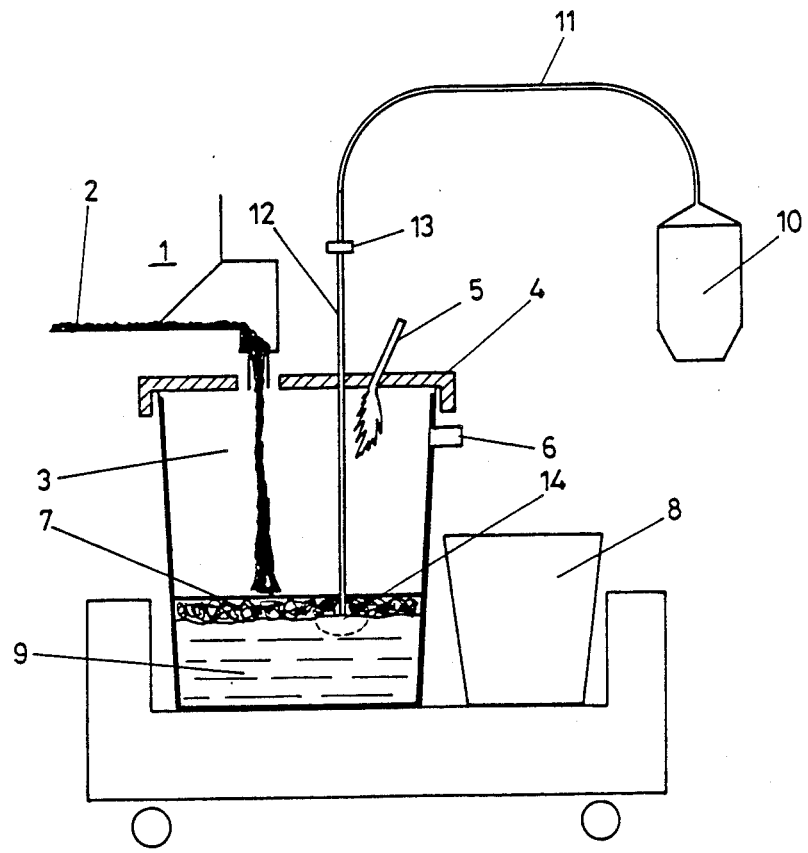

PROCESS FOR HEATING STEEL MELTS AND AN APPARATUS FOR CARRYING OUT THE PROCESS

This invention relates to a method and apparatus for heating steel melts covered with a slag having a high iron oxide content. The method is used in particular in continuous steel making processes, such as the KVA process, employing metallo-thermal heat.

In continuous steel making processes, in particular in the KVA process, a metal/slag mixture, which is heated to just above the melting point runs into a collecting vessel.

In order to prevent the continuously flowing steel from solidifying in the collecting ladle, thereby resulting in shell formation and solidification of the melt if it remains for an extended period of time in the vessel, even when heated to high temperature, additional heat must be applied to achieve superheating.

Additional heat can be supplied by heating the ladle or, among other ways, by adding exothermally reacting substances to the continuously inflowing metal/slag mixture.

When silico-thermal processes are used, superheating is brought about by the reaction of FeSi with the FeO and CaO in the slag, so that a superheated slag is formed, which then gives off the bulk of the absorbed heat to the steel bath.

An object of the invention is to ensure that the heat generated in the slag in the silico-thermal processes, and in general in the metallo-thermal processes is better and more efficiently given off to the steel bath.

In accordance with the invention metals which react exothermally with the oxygen in the bath and the slag are injected into the phase boundary zone between the bath and the slag, possibly together with slagging agents. Because metals reacting exothermally with the bath and the oxygen in the slag are injected into the phase boundary zone, possibly together with slagging agents, most of the heat of reaction is formed in the phase boundary zone and given off directly to the bath beneath. Thus, for the same amount of heat input a greater degree of superheating of the bath and less superheating of the total slag content is achieved.

Because most of the heat is generated by metallo-thermal reactions in the phase boundary zone, the reliable separation of slag and bath is only very slightly impaired. The carrier gas used for injecting the metals into the phase boundary zone bubbles through the slag but not through the entire bath, so that complete mixing of bath and slag is avoided and the stratification existing between the slag and the bath is not broken down.

The carrier gas can be an inert gas such as, for example, nitrogen or argon, and together with such carrier gases it is also possible to inject slagging agents in order to improve the slag formation and to increase the iron yield. Due to the reaction between the slag and the metallo-thermally active metals, such as aluminium or silicon, or a ferrosilicon, mixtures thereof or alloys, iron oxide is partially reduced so that the iron yield is improved.

In order to ensure in a simple manner that the injection of metals which react exothermally with the bath and with the oxygen in the slag is actually limited to the phase boundary zone, the apparatus for implementing this method is advantageously designed in such a way that an injection lance is height adjustably arranged with its nozzle over the contents of the ladle in the area of the bath/slag phase boundary. Such a height adjustably arranged lance can in principle be inserted into the collecting ladle both from above as well as from below. However, insertion from above is preferred over insertion from below due to the sealing problems encountered in the latter case.

In such a design, the materials selected for the lance can resist both the temperature of the melt and the temperature of the slag; however an appropriate mechanism must be chosen to control the vertical travel of the lance so that the nozzle remains in the phase boundary between the bath and the slag as the bath level in the collecting ladle rises.

The apparatus according to the invention can be designed in a particularly simple manner by manufacturing the injection lance from a material which is resistant to the temperature of the slag but melts at the temperature of the bath. In particular the lance may be made of pure iron or low carbon iron. The lance is positioned above the ladle, with its nozzle close to the bottom of the ladle, and as the bath level rises and the lance melts, so its nozzle always remains in the area of the respective bath/slag phase boundary. A self-consuming lance of this kind is designed in such a way that as the bath level rises, the nozzle of the lance automatically remains in the phase boundary zone between the bath and the slag, so that no complicated control is required for the vertical travel of the lance.

When the pouring of the steel and slag mixtures into the collecting ladle commences, the injection tube is inserted to the maximum depth and extends down to near the bottom of the ladle. As the ladle continues to fill up, the portion of the lance projecting into the steel bath is melted away and a cooling system, which might be needed to ensure that the lance remains intact over the zone corresponding to the thickness of the slag layer can be adjusted by varying the output of the pneumatic transportation system. For this purpose, the system is advantageously designed by connecting the lance to a pneumatic transportation system for solids having an adjustable carrier gas supply rate. By adjusting the carrier gas supply rate it is possible to adjust the cooling performance, and furthermore the exact amount of exothermally reacting metals required to heat the melt can be reliably delivered.

Controlling the injection process in such a manner that the exothermally reacting metal is introduced exclusively into the phase boundary zone prevents any excessive enrichment of exothermally reacting metals in the bath, and by controlling the carrier gas supply rate excessive penetration of the jet into the underlying bath can also be avoided. The exothermally reacting metals may be supplied as a powdered mixture, and they can be introduced together with powdered slagging agents. The reaction in the intermediate layer or interface layer between the slag and the steel guarantees better transfer of heat into the bath without excessive heating of the entire slag layer. Even at high carrier gas supply rates, the zone through which the gases must pass is restricted to the zone of the slag layer so that, although a certain amount of swirling of the slag layer is achieved, there is overall no substantial mixing between the slag and the bath.

The invention will now be described in more detail, by way of example only, with reference to the accompanying drawings in which the single FIGURE schematically illustrates a melting vessel 1, from which a metal/slag mixture 2 flows via the tapping unit into a highly heated, lidded collecting ladle 3. The lid 4 is provided with a lid-mounted burner 5 so that the ladle can be heated also during the tapping process. The collecting ladle 3 in addition is provided with a slag outlet opening 6 through which the floating layer of slag 7 flows out by displacement, once it reaches the opening 6, into a slag pot 8. Once the steel level 9 reaches the opening 6, the collecting ladle 3 is replaced by a new one and at the same time, of course, the slag pot 8 is also replaced.

In order to superheat the steel, powdered mixtures of FeSi and slagging agents are fed by a pneumatic transportation system 10, via a supply line 11 through a steel tube 12 having the shape of a lance, which is flanged by means of a fast snap coupling 13 to the supply line 11 of the pneumatic transportation system 10, and the powdered mixtures are injected into the intermediate layer 14 between the metal and the slag. The delivery pressure of the inert carrier gas is so adjusted that no deep penetration into the metal can occur and the reaction is therefore restricted to the boundary layer between the metal and the slag. As the slag 7 and the steel level 9 rise during the continuous tapping process, the steel tube 12 also continuously melts so that its mouth is always positioned in the metal/slag interface. This happens because the medium flowing in the steel tube 12 (inert gas loaded with a powdered mixture of FeSi and slagging agents) protects the steel tube 12 from being melted in the slag but not in the steel bath.

The pneumatic transportation system 10 is designed in such a manner that the supply rate of the media can be adjusted to the rate of the continuous tapping process, which can fluctuate operationally within certain limits. If undesired boiling reactions occur, it is also possible to stop these by suddenly increasing the supply rate of the media.

It is also possible to operate successively out of two separate bunkers in the pneumatic transportation system 10, with one bunker containing pure FeSi powder and the other bunker containing powdered slagging agents.

The metallo-thermal process, during which heat is generated by injection of a powdered metal which reacts exothermally with the slag and especially with the FeO and the CaO in the slag, brings about a reduction in the FeO content of the slag, and the powdered slag mixtures can be simultaneously conveyed to liquefy the slag and/or to achieve better progression of the reactions.

The embodiments of the invention in which an exclusive property or privilege is claimed are defined as follows:

1. A method of heating steel melts which are covered by a slag rich iron oxide, comprising the step of injecting a metal which reacts exothermally with the melt and with oxygen contained in the slag into a phase boundary zone between the melt and the slag.

2. A method as claimed in claim 1, where said metal which reacts exothermally with the melt is added with a slagging agent.

3. An apparatus for heating steel melts which are covered by a slag rich in iron oxide, comprising a ladle for containing the steel melt, an injection lance for injecting a metal which reacts exothermally with the melt and with oxygen contained in the slag, and means for maintaining an outlet nozzle of the lance in a phase boundary between the melt and the slag.

4. An apparatus for heating steel melts which are covered by a slag rich in iron oxide, comprising a ladle for containing the steel melt, an injection lance for injecting a metal which reacts exothermally with the melt and with oxygen contained in the slag, said injection lance being made of a metal which is resistant to the temperature of the slag and which melts at the temperature of the melt, said injection lance initially having an outlet nozzle located close to the bottom of the ladle whereby as the level of the melt rises within the ladle, the portion of the lance within the melt melts away, thus ensuring that the nozzle remains in a phase boundary between the melt and the slag.

5. An apparatus as claimed in claim 4, wherein the injection lance is made of pure iron.

6. An apparatus as claimed in any of claims 2 to 4, wherein a pneumatic transportation device for transporting solids, and having an adjustable carrier gas supply rate, is attached to the lance.

7. An apparatus as claimed in claim 4, wherein the injection lance is made of low-carbon steel.

* * * * *